April 14, 1970   G. A. SMIDA   3,505,846
HYDRAULIC CHUCK
Filed Jan. 15, 1968
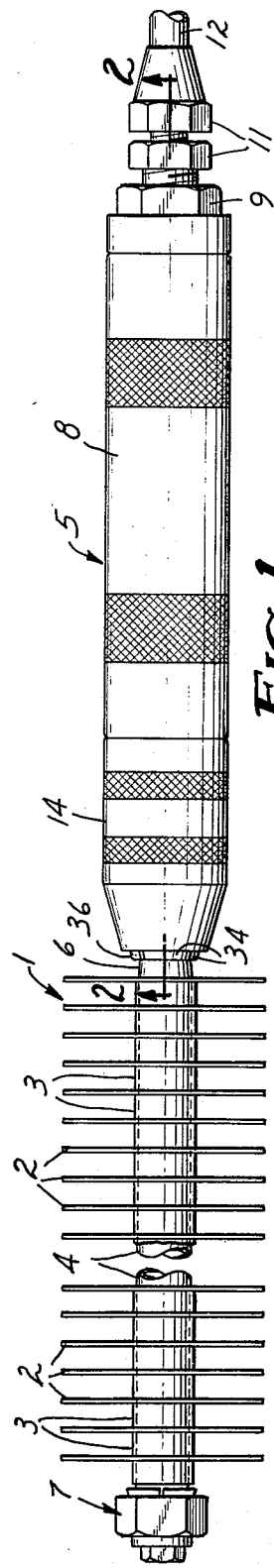
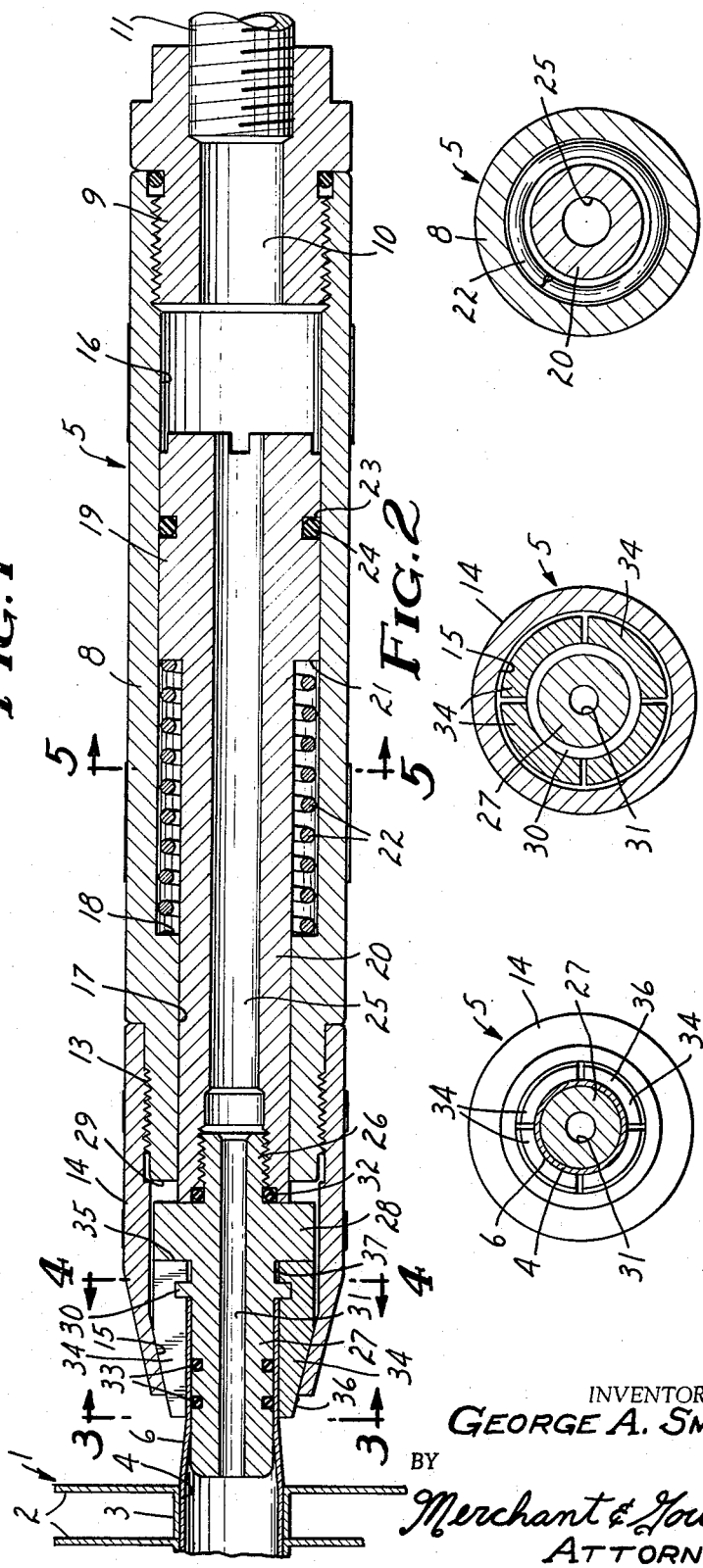
INVENTOR.
GEORGE A. SMIDA
BY
Merchant & Gould
ATTORNEYS ମ
United States Patent Office 3,505,846
Patented Apr. 14, 1970

3,505,846
HYDRAULIC CHUCK
George A. Smida, 6511 46th Ave. N.,
Minneapolis, Minn. 55428
Filed Jan. 15, 1968, Ser. No. 697,693
Int. Cl. B21d 22/10
U.S. Cl. 72—61                                   5 Claims

ABSTRACT OF THE DISCLOSURE

A hydraulic chuck for gripping a tube to be radially expanded and for admitting hydraulic fluid under tube expanding pressure to the tube. A fluid powered piston actuated mandrel is snugly receivable into the tube and cooperates with a chuck portion to move gripping jaws into clamping engagement with the portion of the tube in which the mandrel is received.

BACKGROUND OF THE INVENTION

Fluid pressure operated devices for radially expanding portions of tubing are known, such devices being disclosed in U. S. Patent Nos. 1,448,457; 2,479,702; 2,938,-562 and 3,200,627. The structures of these patents include fluid conveying mandrels receivable within the tubes, means for expanding the mandrels to hold the tubing, and die elements against which portions of the tubing are flared or otherwise wormed by fluid pressure. These expanding devices are customarily used to provide short bulges in tubing for coupling purposes and the like.

SUMMARY OF THE INVENTION

An important object of this invention is the provision of means for tightly gripping one end of, and simultaneously delivering tube-expanding fluid to, an elongated tube to radially expand the same, such as for instance, into tight fitting engagement with a plurality of radiating fins mounted on the tube.

Another object of this invention, is the provision of a hydraulic chuck which is simple and inexpensive to produce, which is quickly and easily applied to a tube to be expanded, and which firmly grips the tube during expansion thereof.

To the above ends, I provide an elongated cylinder having a fluid opening at one end for connection to a source of fluid under pressure, and a tubular head on the other end of the cylinder and having a tapered bore portion. A piston axially movably mounted in the cylinder has mounted at one end a mandrel which extends axially through the tapered bore portion and which is snugly receivable in an end portion of a tube to be expanded. Gripping jaws in the head are adapted to engage the tapered bore portion responsive to movement of the piston in one direction, and be moved radially inwardly into gripping engagement with said end portion of the tube. The piston and mandrel have aligned axial openings therethrough for passage of fluid into the tube to be expanded, the fluid being operative to impart axial movement to the piston in a jaw closing direction. The mandrel and the gripping jaws have inter-engaging portions whereby the jaws are moved in opposite directions axially of the cylinder, with the piston and mandrel.

DESCRIPTION OF THE DRAWINGS

FIG. 1 is a fragmentary view in side elevation of the hydraulic chuck of this invention, shown as being applied to a tube and fin assembly;

FIG. 2 is an enlarged axial section taken substantially on the line 2—2 of FIG. 1; and FIGS. 3, 4 and 5 are transverse sections taken on the line 3—3, 4—4, and 5—5 respectively, of FIG. 2.

DETAILED DESCRIPTION

The tube and fin radiator assembly 1 is shown in FIGS. 1 and 2 as comprising a plurality of radiator fins 2 having central openings defined by tubular flanges or the like 3 which receive an elongated tube 4. The fins 2 and tube 4 are usually of copper or other metal having good heat transfer qualities, and, in assembly, the tube 4 is radially expanded into tight fitting engagement with the tubular flanges 3 by means of hydraulic pressure applied to the interior of the tube 4.

The hydraulic chuck of this invention, indicated generally at 5, for the purpose of tightly gripping one end portion 6 of the tube 4, and admitting hydraulic fluid to the interior thereof, is used in connection with a plug 7 utilized to close the opposite end of the tube 4. The plug 7 is conventional in nature, and in and of itself does not comprise the instant invention. Hence, for the sake of brevity, detailed showing and description thereof is omitted.

The hydraulic chuck of this invention comprises a cylinder 8 screw threaded at one end to receive a threaded cap 9 having an axial opening 10 therethrough and a conventional fitting 11 for a conduit 12 which may be assumed to be connected to a source of fluid under pressure, not shown. At its opposite end portion, the cylinder 8 is formed to provide a diametrically reduced screw threaded neck 13, on which is screw threaded a hollow head 14 formed to provide a tapered bore portion 15. The cylinder 8 further defines a cylindrical inner wall 16 and, at the neck portion 13 thereof is formed to provide a diametrically reduced axial bore 17, the bore 17 and cylindrical wall 16 terminating at their adjacent ends at an annular shoulder 18. A piston 19 is axially slidably mounted in the cylinder 8 and is provided with a diametrically reduced elongated axial stem portion 20 that slidably extends through the axial bore 17. The piston 19 with its stem portion 20 defines an annular shoulder 21 which faces the annular shoulder 18, and the coil compression spring 22 is interposed between the shoulders 18 and 21 to yieldingly urge the piston 19 toward the end cap 9. The piston 19 is formed to provide a radially outwardly opening annular channel 23 in which is mounted a piston ring in the nature of a conventional rubber-like O-ring 24.

The piston 19 with its stem portion 20 is drilled or bored to provide an axial opening 25 therethrough, the outer end of the stem portion 20 being counterbored and screw threaded to receive the threaded inner end portion 26 of a mandrel 27 that is axially aligned with the piston stem portion 20 and which extends axially outwardly through the tapered bore portion 15 of the head 14. The mandrel 27 is formed to provide a radially outwardly projecting annular flange 28 adjacent the threaded portion 26, one side of the flange 28 engaging the adjacent end 29 of the neck 13 to limit spring imparted movement of the piston 19 toward the end cap 9 of the cylinder 8. The mandrel 27 is further formed to provide a second radially outwardly projecting annular flange 30 in axially outwardly spaced relationship to the flange 28, for a purpose which will hereinafter be described. A fluid opening 31 extends axially through the mandrel 27 in axial alignment with the opening 25 in the piston 19, and an O-ring 32 is mounted between the mandrel 27 and the piston stem portion 20 to prevent leakage of fluid through the threaded joint between the mandrel 27 and the piston stem portion 20.

Axially outwardly of the flange 30, the mandrel 27 is of a diameter to be snugly received into the end portion 6 of the tube 4 in its unexpanded normal condition, the flange 30 providing stop means for limiting movement of the mandrel axially into the tube 4. As shown in FIG. 2, the mandrel is provided with a pair of radially outwardly opening circumferential grooves in which are mounted sealing rings in the nature of conventional O-rings 33. A plurality, as shown four, of cross-sectionally arcuate tube gripping jaws 34 are disposed in circumferentially spaced relationship in the tubular head 14, and have rear ends 35 disposed to be engaged by the mandrel flange 28, and forwardly converging surface portions 36 that conform generally to the tapered bore 15 of the head 14. The arcuate inner surfaces of the jaws 34 have a radius of curvature substantially equal to the radius of the outer surface of the tube end portion 6, the jaws 34 being formed to provide radially inwardly opening arcuate channels 37 for free reception therein of the mandrel flange 30.

In the normal unpressurized state of the chuck 5, the piston 19 is moved by the spring 22 into a position wherein the mandrel flange 28 abuts the end wall 29 of the cylindrical neck 13. In this position of the piston 19 and mandrel 27, the gripping jaws 34 are disposed in an axially inward position wherein the surfaces 36 thereof are out of engagement with the tapered bore portion 15. Then when the chuck is applied to the end portion 6 of the tube 4 and fluid under pressure is admitted to the chuck 5, through the fitting 11, and end cap 9, the fluid, not shown, flows through the aligned openings 25 and 31 into the tube 4 to fill the same. As fluid pressure is increased, the piston 19 and mandrel 27 are moved axially outwardly toward the radiator assembly 1, the surfaces 36 of the gripping jaws 34 engaging the tapered bore bore portion 15 of the tubular head 14, whereupon the gripping jaws 34 are cammed into tight gripping engagement with the tube end portion 6. Further increase of fluid pressure within the chuck 5 and tube 4 causes the tube 4 axially outwardly of the gripping jaws 34 and mandrel 27 to radially expand into tight fitting engagement with the tubular flanges 3 of the fins 2. As shown in FIG. 2, the sealing rings 33 underlie the gripping jaws 34, so that a tight seal is maintained between the tube end portion 6 and the mandrel 27 to prevent leakage of hydraulic fluid therebetween. After the tube 4 is properly expanded, pressure on the hydraulic fluid therein is released by suitable valve means, not shown, but which may be assumed to be associated with the conduit 12, whereupon the spring 22 will move the piston 19 and mandrel 27 toward the end cap 9, the mandrel flange 30 pulling the gripping jaws 34 axially inwardly out of engagement with the tapered bore portion 15, permitting the mandrel 27 to be withdrawn from the tube end portion 6.

While I have shown and described a preferred embodiment of my hydraulic chuck, it will be understood that the same is capable of modification without departure from the spirit and scope of the invention, as defined in the claims.

What is claimed is:
1. A hydraulic chuck comprising:
 (a) a cylinder having a fluid opening at one end for connection to a source of fluid under pressure,
 (b) a tubular head on the other end of said cylinder and having a tapered bore portion axially outwardly of the cylinder,
 (c) a piston reciprocably mounted in said cylinder,
 (d) an axial mandrel connected to said piston for common movements therewith and extending axially through said tapered bore portion, said mandrel having a diameter to be snugly received in a tube to be expanded, said piston and mandrel having aligned axial openings therethrough for passage of fluid from said fluid opening to said tube,
 (e) a plurality of circumferentially spaced axially and radially movable tube gripping jaws in said head,
 (f) and inter-engaging means on said mandrel and gripping jaws for moving said gripping jaws into engagement with said tapered bore portion responsive to movement of said piston and mandrel in one direction, whereby said gripping jaws are forced into gripping engagement with the outer surface of the tube to clamp the same on said mandrel.

2. The hydraulic chuck defined in claim 1, in which said cylinder and piston cooperate to define opposite annular shoulders, and in further combination with yielding means engaging said shoulders and urging said piston and mandrel toward said one end of the cylinder and said gripping jaws away from engagement with said tapered bore portion.

3. The hydraulic chuck defined in claim 2, in which said inter-engaging means includes a radially outwardly projecting annular flange on said mandrel disposed between said gripping jaws and the adjacent end of the cylinder, said flange engaging said adjacent cylinder end to limit movement of said piston toward said one end of the cylinder.

4. The hydraulic chuck defined in claim 3, in which said gripping jaws have inner ends disposed for engagement by said mandrel flange to be moved thereby into tube gripping engagement with said tapered bore portion.

5. The hydraulic chuck defined in claim 3, in which said inter-engaging means further includes a second radially outwardly projecting annular flange axially spaced from said first-mentioned flange and radially inwardly opening recesses in said gripping jaws for reception of said second flange, whereby said gripping jaws are moved away from said tapered bore portion responsive to yielding means imparted movement of said piston and mandrel, said second flange providing stop means limiting movement of said mandrel into the tube.

References Cited
UNITED STATES PATENTS

| | | | |
|---|---|---|---|
| 2,941,568 | 6/1960 | Ottestad et al. | 279—43 |
| 2,360,054 | 10/1944 | Haas | 72—392 |
| 2,938,562 | 5/1960 | Watts et al. | 72—61 |
| 3,200,627 | 8/1965 | Hoffman | 72—61 |
| 3,396,980 | 8/1968 | Müller | 279—4 X |

RICHARD J. HERBST, Primary Examiner

A. L. HAVIS, Assistant Examiner

U.S. Cl. X.R.

279—43